US012039953B2

(12) United States Patent
Lee et al.

(10) Patent No.: US 12,039,953 B2
(45) Date of Patent: Jul. 16, 2024

(54) DISPLAY DRIVING METHOD, DISPLAY DRIVER CHIP AND LIQUID CRYSTAL DISPLAY DEVICE

(71) Applicant: Advanced Silicon Display Optoelectronics Corporation Ltd., Shenzhen (CN)

(72) Inventors: Lan Lee, Palo Alto, CA (US); Yi Li, Shenzhen (CN); Rong Hsu, Shenzhen (CN)

(73) Assignee: Advanced Silicon Display Optoelectronics Corporation Ltd., Shenzhen (CN)

( * ) Notice: Subject to any disclaimer, the term of this patent is extended or adjusted under 35 U.S.C. 154(b) by 0 days.

(21) Appl. No.: 18/141,214

(22) Filed: Apr. 28, 2023

(65) Prior Publication Data

US 2023/0360616 A1 Nov. 9, 2023

(30) Foreign Application Priority Data

May 7, 2022 (CN) ........................ 202210495114.2

(51) Int. Cl.
*G09G 3/36* (2006.01)

(52) U.S. Cl.
CPC ......... *G09G 3/3688* (2013.01); *G09G 3/3607* (2013.01); *G09G 2320/0252* (2013.01)

(58) Field of Classification Search
CPC ............... G09G 3/3688; G09G 3/3607; G09G 2320/0252; G09G 3/3685; G09G 2310/0251; G09G 2310/066; G09G 2320/0223; G09G 3/2022
See application file for complete search history.

(56) References Cited

U.S. PATENT DOCUMENTS

| | | | | |
|---|---|---|---|---|
| 2012/0287144 A1* | 11/2012 | Gandhi | G09G 3/2029 345/589 |
| 2017/0061848 A1* | 3/2017 | Nakagoshi | G06T 7/90 |
| 2018/0090101 A1* | 3/2018 | Offredi | G09G 5/10 |
| 2020/0210177 A1* | 7/2020 | Lakshminarayanan | H03K 5/1565 |
| 2021/0097951 A1* | 4/2021 | Toyotaka | G02F 1/1368 |
| 2022/0270558 A1* | 8/2022 | Ozaki | G09G 3/3607 |

* cited by examiner

*Primary Examiner* — Premal R Patel
(74) *Attorney, Agent, or Firm* — ScienBiziP, P.C.

(57) ABSTRACT

The present disclosure discloses a display driving method, a display driver chip and a liquid crystal display device. The display driving method includes: within a display duration of a first bit-plane data, controlling the display device to display the first bit-plane data; when a loading duration of a single bit-plane data is longer than the display duration of the first bit-plane data, after completing the display of the first bit-plane data, controlling a pixel liquid crystal layer corresponding to the first bit-plane data in the display device to return to a target state, and completing loading of a second bit-plane data while maintaining the pixel liquid crystal layer corresponding to the first bit-plane data in the target state. Based on the above method, the cost of data driving can be effectively reduced, and the display effect of the liquid crystal display device can be improved.

17 Claims, 3 Drawing Sheets

DISPLAY DRIVING METHOD, DISPLAY DRIVER CHIP AND LIQUID CRYSTAL DISPLAY DEVICE

FIELD

The present disclosure relates to the technical field of display, and in particular to a display driving method, a display driver chip, and a liquid crystal display device.

BACKGROUND

In the prior art, when controlling a liquid crystal display device to display an image based on the data to be displayed, the data to be displayed can be divided into multiple bit-plane data according to the color scale, and then each bit-plane data is loaded and displayed one by one. When displaying a plurality of bit-plane data, different bit planes are usually assigned different times for display. In this way, when a display duration of a current bit-plane data is less than a loading duration of the next bit-plane data, the operation of loading the next bit-plane data while displaying the current bit-plane data cannot be performed.

In order to ensure that the loading of the next bit-plane data can be completed during the display of each bit-plane data in the plurality of bit-plane data, the liquid crystal display device has a high requirement on the data loading rate, and the cost of the data transmission device used is high.

SUMMARY

The technical problem mainly solved by the present disclosure is how to reduce the cost of data driving.

In order to solve the above technical problem, the first technical solution provided by the present disclosure is to provide a display driving method, which is applied to a liquid crystal display device. The display driving method includes: within a display duration of a first bit-plane data, controlling the liquid crystal display device to display the first bit-plane data; when a loading time of a single bit-plane data is longer than the display duration of the first bit-plane data, after completing the display of the first bit-plane data, controlling a pixel liquid crystal layer corresponding to the first bit-plane data in the liquid crystal display device to return to a target state, and completing loading of a second bit-plane data while maintaining the pixel liquid crystal layer corresponding to the first bit-plane data in the target state. The second bit-plane data is displayed adjacent to the first bit-plane data. The target state is a state of liquid crystal molecules in the pixel liquid crystal layer under the control of no electric field.

In order to solve the above technical problem, the second technical solution provided by the present disclosure is to provide a display driver chip. The display driver chip includes: a logic module configured to split a received RGB image data into monochrome image data corresponding to red, green, and blue respectively; a bit-plane data conversion module configured to convert the monochrome image data into several bit-plane data; a first register module and a second register module configured to store the bit-plane data; a data sending module configured to send the bit-plane data to the first register module or the second register module; a data receiving module configured to receive the bit-plane data from the second register module or the first register module; a display module configured to display the bit-plane data; and a pixel array module configured to sequentially load the bit-plane data received from the data receiving module and control the display module to display corresponding bit-plane data based on the received bit-plane data. The bit-plane data includes a first bit-plane data and a second bit-plane data. Within a display duration of the first bit-plane data, the pixel array module controls the display module to display the first bit-plane data. When a loading duration of a single bit-plane data is longer than the display duration of the first bit-plane data, after completing the display of the first bit-plane data, the pixel array module controls a pixel liquid crystal layer corresponding to the first bit-plane data in the display module to return to a target state. The target state is a state of liquid crystal molecules in the pixel liquid crystal layer under the control of no electric field. The pixel array module completes loading of the second bit-plane data while maintaining the pixel liquid crystal layer corresponding to the first bit-plane data in the target state, and controls the display module to display the second bit-plane data adjacent to the first bit-plane data.

In order to solve the above technical problem, the third technical solution provided by the present disclosure is to provide a liquid crystal display device. The liquid crystal display device includes a processor; and a non-transitory computer-readable storage medium coupled to the processor and storing programming instructions for execution by the processor. The programming instructions instruct the processor to: within a display duration of a first bit-plane data, control the liquid crystal display device to display the first bit-plane data; when a loading duration of a single bit-plane data is longer than the display duration of the first bit-plane data, after completing the display of the first bit-plane data, control a pixel liquid crystal layer corresponding to the first bit-plane data in the liquid crystal display device to return to a target state, the target state being a state of liquid crystal molecules in the pixel liquid crystal layer under the control of no electric field; and complete loading of a second bit-plane data while maintaining the pixel liquid crystal layer corresponding to the first bit-plane data in the target state, and control the liquid crystal display device to display the second bit-plane data adjacent to the first bit-plane data.

The beneficial effects of the present disclosure are: different from the prior art, in the technical solution of the present disclosure, when the loading duration of a single bit-plane data is longer than the display duration of the first bit-plane data, the pixel liquid crystal layer corresponding to the first bit-plane data in the liquid crystal display device is controlled to return to the target state after controlling the liquid crystal display device to display the first bit-plane data, and the loading of the second bit-plane data is completed while maintaining the pixel liquid crystal layer corresponding to the first bit-plane data in the target state, so that the liquid crystal display device can obtain enough time to load the second bit-plane data before displaying the second bit-plane data, and the cost of data driving is reduced.

BRIEF DESCRIPTION OF DRAWINGS

In order to more clearly illustrate the technical solutions in the embodiments of the present disclosure, the drawings that need to be used in the description of the embodiments will be briefly introduced below. Obviously, the drawings in the following description are only some embodiments of the present disclosure. For those skilled in the art, other drawings can also be obtained based on these drawings without creative effort.

DETAILED DESCRIPTION

Figure 1:
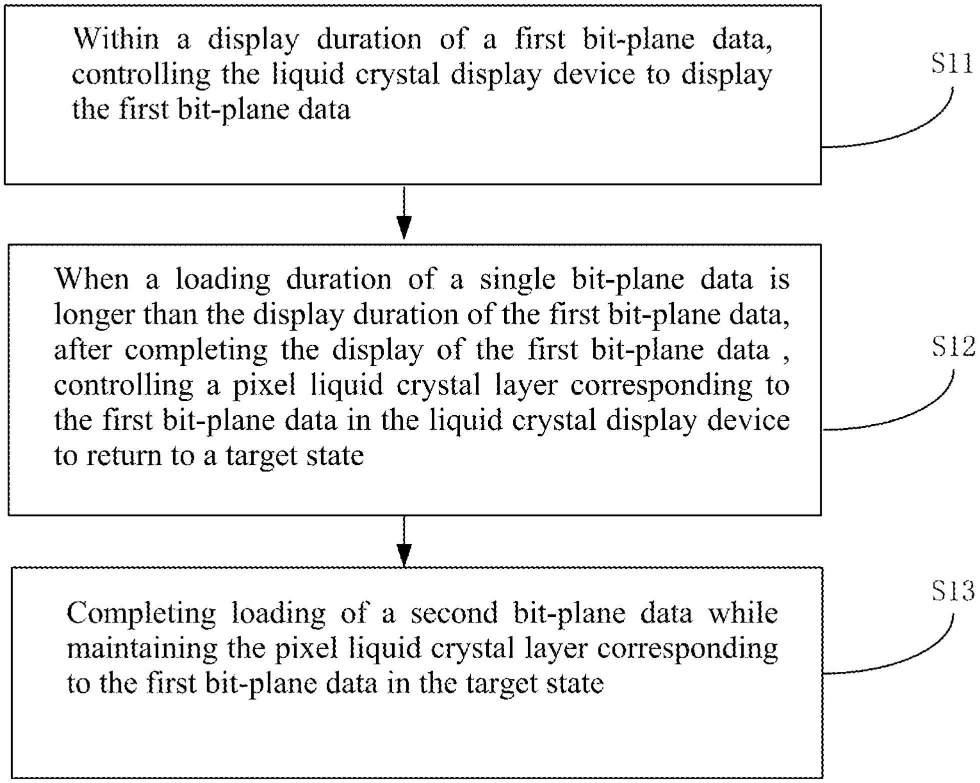
FIG. 1 is a flowchart of a first embodiment of a display driving method of the present disclosure.

The technical solutions in the embodiments of the present disclosure will be clearly and completely described below in conjunction with the drawings in the embodiments of the present disclosure. Apparently, the described embodiments are only some of the embodiments of the present disclosure, not all of them. Based on the embodiments in the present disclosure, all other embodiments obtained by persons of ordinary skill in the art without making creative efforts belong to the scope of protection of the present disclosure.

The terms "first" and "second" in the present disclosure are only used for descriptive purposes, and should not be understood as indicating or implying relative importance or implicitly specifying the quantity of indicated technical features. In the description of the present disclosure, "a plurality of" means at least two, such as two, three, etc., unless otherwise specifically defined. Furthermore, the terms "comprising" and "having", as well as any variations thereof, are intended to cover a non-exclusive inclusion. For example, a process, method, system, product or device comprising a series of steps or units is not limited to the listed steps or units, but optionally further includes unlisted steps or units, or optionally further includes for other steps or units inherent in the process, method, product or device.

A liquid crystal display device applying the display driving method of the present disclosure can be an LCoS liquid crystal display device. For a digitally modulated LCoS liquid crystal display device, a deflection angle of liquid crystal molecules can be controlled by applying a PWM voltage signal to a liquid crystal pixel, thereby controlling the light transmittance of the liquid crystal pixel. Compared with the analog modulation type LCoS liquid crystal display device, the digital modulation type LCoS liquid crystal display device only controls the flipping of the liquid crystal molecules by adjusting the duty ratio of the two voltages, and controls the modulation accuracy by dividing the time. The higher the modulation rate, the higher the control precision of the liquid crystal molecules.

A digital modulation method adopted by a digitally modulated LCoS liquid crystal display device is to time-divide a frame modulation period according to binary weights, and each divided independent time period corresponds to a bit plane of data. For binary grayscale data, each bit of data corresponds to a bit plane. For example, an 8-bit binary grayscale data corresponding to a grayscale value of 00000000 to 11111111 (binary) can be divided into 8 bit planes and corresponding 8 bit-plane data, corresponding to display time of $2^7$, $2^6$, $2^5$, $2^4$, $2^3$, $2^2$, $2^1$, and $2^0$, respectively. During the modulation display period, only one bit-plane data can be written into the pixel storage unit corresponding to the pixel at a time. During the display of one bit-plane data, the next bit-plane data to be displayed needs to be written into the pixel storage unit corresponding to the pixel. Therefore, the less the display time of a bit plane, the higher the requirement for the data writing rate of the next bit plane, and the higher the required writing rate, the higher the cost of the data transmission device used, and at the same time it will affect the chip area occupied by circuit devices.

Firstly, the present disclosure proposes a display driving method, which is applied to a liquid crystal display device, as shown in FIG. 1, which is a flowchart of a first embodiment of a display driving method of the present disclosure. The display driving method includes:

Step S11: within a display duration of a first bit-plane data, controlling the liquid crystal display device to display the first bit-plane data.

Wherein, during the driving process of data display, the liquid crystal display device can be controlled to control each pixel to display based on the first bit-plane data within the display duration corresponding to the first bit-plane data. In one or more embodiments of the present disclosure, the liquid crystal display device may specifically be an LCoS liquid crystal display device.

Step S12: when a loading duration of a single bit-plane data is longer than the display duration of the first bit-plane data, after completing the display of the first bit-plane data, controlling a pixel liquid crystal layer corresponding to the first bit-plane data in the liquid crystal display device to return to a target state.

The target state is a state of liquid crystal molecules in the pixel liquid crystal layer under the control of no electric field. At this time, the pixel liquid crystal layer is in a state of blocking light from passing through, for example: in a user's visual perception, the pixels corresponding to the pixel liquid crystal layer in the target state are displayed in black, and the pixels corresponding to the pixel liquid crystal layer not in the target state are displayed in gray with different grayscales or white.

Step S13: completing loading of a second bit-plane data while maintaining the pixel liquid crystal layer corresponding to the first bit-plane data in the target state.

Wherein, when a liquid crystal display device displays image data, in order to obtain a better display effect, usually one image frame includes a plurality of bit-plane data displayed in sequence. For example, the first bit-plane data and the second bit-plane data are displayed adjacently in sequence. That is, the first bit-plane data and the second bit-plane data are two bit-plane data that need to be sequentially and adjacently displayed among the plurality of bit-plane data corresponding to one frame of image to be displayed by the liquid crystal display device. After the liquid crystal display device displays based on the first bit-plane data, the next bit-plane data to be displayed is the second bit-plane data.

It can be understood that before displaying the plurality of bit-plane data of the frame of image, the bit-plane data needs to be loaded first. Taking the sequentially displayed first bit-plane data and second bit-plane data as an example, in the prior art, usually, the first bit-plane data is first loaded and displayed; then the second bit-plane data is loaded and displayed. The loading speed of the bit-plane data is related to the hardware of the liquid crystal display device, that is, the same liquid crystal display device, the loading time of any bit-plane data (i.e., a single bit-plane) of the image frame is consistent. Specifically, the above-mentioned single bit-plane data may be the loading duration of any bit-plane data (that is, a single bit-plane) of the frame of image.

When it is judged that the loading duration of a single bit-plane data is longer than the display duration of the first bit-plane data, that is, when it is judged that the loading duration of the second bit-plane data is longer than the display duration of the first bit-plane data, it can be determined that when the liquid crystal display device displays based on the first bit-plane data, the display duration is not enough for the liquid crystal display device to finish loading the second bit-plane data. Therefore, at this time, after the display of the first bit-plane data is completed, the loading of the second bit-plane data is completed when the pixel liquid crystal layer corresponding to the first bit-plane data in the liquid crystal display device is controlled to return to the target state, so that the liquid crystal display device can subsequently perform corresponding display smoothly based on the second bit-plane data.

In one embodiment, controlling the pixel liquid crystal layer corresponding to the first bit-plane data in the liquid crystal display device to return to the target state can be realized by applying a preset voltage to the pixel liquid crystal layer corresponding to the first bit-plane data through a pixel electrode in the liquid crystal display device to form a negative voltage difference between the pixel electrode and a common electrode in the liquid crystal display device. The negative voltage difference can make the state corresponding to the pixel liquid crystal layer corresponding to the pixel return to the target state, so that the liquid crystal molecules in the pixel liquid crystal layer completely block the passage of light, and prevent the light passing through the pixel liquid crystal layer of the pixel from affecting the normal display of the pixel liquid crystal layer of the adjacent pixels.

In the above display driving method, by controlling the liquid crystal display device to return to the target state after the pixel liquid crystal layer corresponding to the first bit-plane data returns to the target state, and then load the second bit-plane data, so that the loading duration of the liquid crystal display device for the bit-plane data is not limited to the display duration of a certain bit-plane data (e. g., the lowest bit-plane data). Therefore, the requirement of the liquid crystal display device on the rate of data transmission can also be reduced, thereby reducing the cost of data driving. Furthermore, when the pixel liquid crystal is performing image display, after the display of the first bit-plane data is completed, the pixel liquid crystal is controlled to return to the target state, which can prevent the liquid crystal display from causing unnecessary influence on the display of the adjacent second bit-plane data after the display of the first bit-plane data is completed, thereby improving the display effect of the liquid crystal display device.

Different from the prior art, in the technical solution of the present disclosure, when the loading duration of a single bit-plane data is longer than the display duration of the first bit-plane data, the pixel liquid crystal layer corresponding to the first bit-plane data in the liquid crystal display device is controlled to return to the target state after controlling the liquid crystal display device to display the first bit-plane data, and the loading of the second bit-plane data is completed while maintaining the pixel liquid crystal layer corresponding to the first bit-plane data in the target state, so that the liquid crystal display device can obtain enough time to load the second bit-plane data before displaying the second bit-plane data, and the cost of data driving is reduced.

In addition, in the prior art, after the pixel liquid crystal layer corresponding to a pixel is displayed based on the first bit-plane data, the display state corresponding to the pixel liquid crystal layer in the first bit-plane data usually easily affects the pixel liquid crystal layer corresponding to the adjacent pixels, so that the display effect of the liquid crystal display device is poor. In the technical solution of the present disclosure, the pixel liquid crystal layer corresponding to the first bit-plane data returns to the state of the liquid crystal molecules in the pixel liquid crystal layer under the control of no electric field after displaying the first bit-plane data, so as to avoid the mutual influence of the liquid crystals of pixels in the liquid crystal display device when displaying data on adjacent bit planes, and improves the display effect of the liquid crystal display device.

Figure 2:
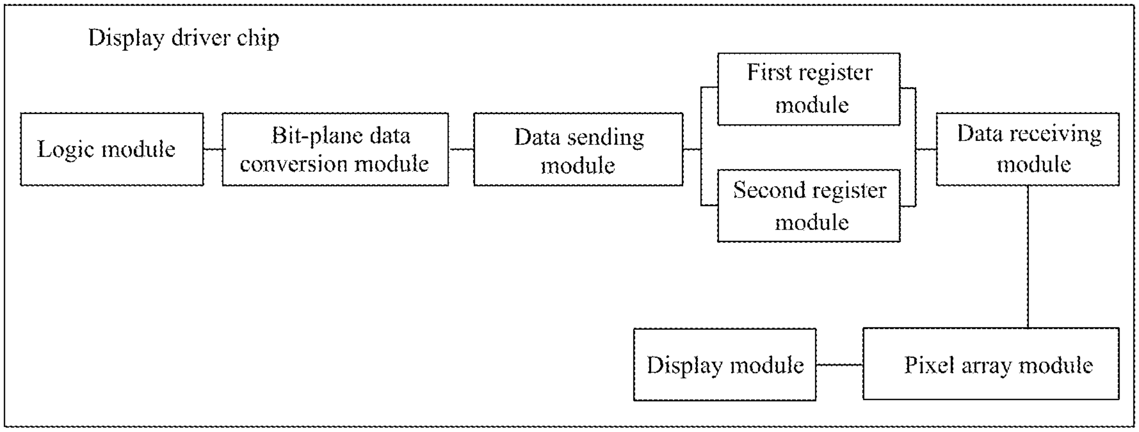
FIG. 2 is a diagram of a functional structure of an embodiment of a display driver chip of the present disclosure.

Please refer to FIG. 2. FIG. 2 is a diagram of a functional structure of an embodiment of a display driver chip of the present disclosure. The above display driver chip is used to drive the above liquid crystal display device. The above display driver chip may include a logic module, a bit-plane data conversion module, a data sending module, a first register module, a second register module, a data receiving module, a pixel array module and a display module.

The logic module can split a received RGB image data into monochrome image data corresponding to red, green, and blue respectively. The bit-plane data conversion module can convert monochrome image data into several bit-plane data. The data sending module is configured to send bit-plane image data to the first register module or the second register module, the data receiving module is configured to receive the bit-plane image data from the second register module or the first register module, wherein when the first register module sends data to the data receiving module, the data sending module can send data to the second register module, and so on. Based on the method of data transmission in turn, the efficiency of data transmission can be effectively improved. The pixel array module is configured to sequentially load the bit-plane data received from the data receiving module and control the display module to display corresponding bit-plane data based on the received bit-plane data. In the above display driving method, the module for loading bit-plane data is the pixel array module.

Figure 3:
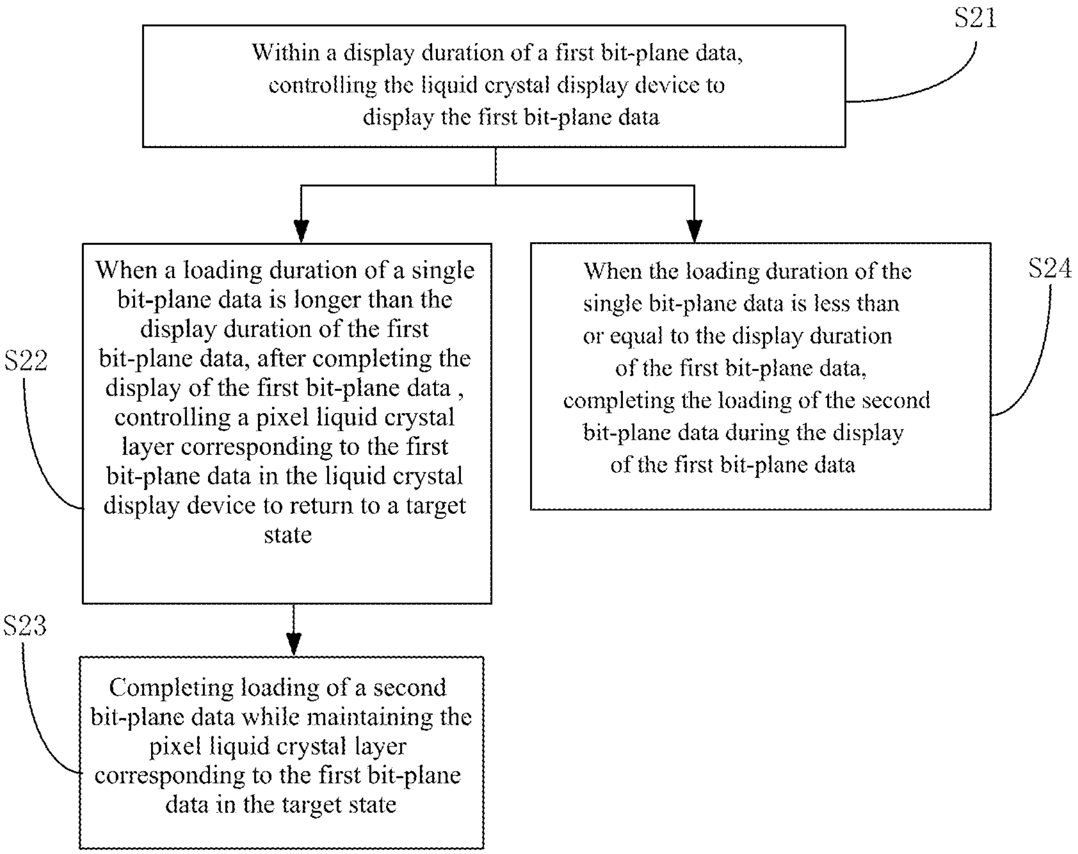
FIG. 3 is a flowchart of a second embodiment of the display driving method of the present disclosure.

The present disclosure further proposes a display driving method, which is applied to a liquid crystal display device, as shown in FIG. 3. FIG. 3 is a flowchart of a second embodiment of the display driving method of the present disclosure. The display driving method includes:

Step S21: within a display duration of a first bit-plane data, controlling the liquid crystal display device to display the first bit-plane data.

Step S22: when a loading duration of a single bit-plane data is longer than the display duration of the first bit-plane data, after completing the display of the first bit-plane data, controlling a pixel liquid crystal layer corresponding to the first bit-plane data in the liquid crystal display device to return to a target state.

Step S23: completing loading of a second bit-plane data while maintaining the pixel liquid crystal layer corresponding to the first bit-plane data in the target state.

Steps S21-S22 in the second embodiment are the same as steps S11-S12 in the first embodiment, and will not be repeated here.

Optionally, as shown in FIG. 3, the display driving method further includes:

Step S24: when the loading duration of a single bit-plane data is less than or equal to the display duration of the first bit-plane data, completing the loading of the second bit-plane data during the display of the first bit-plane data.

Specifically, after step S21 is executed, different steps may be performed subsequently according to different situations. If the loading duration of the single bit-plane data is longer than the display duration of the first bit-plane data, then execute steps S22 and S23, and if the loading duration of the single bit-plane data is less than or equal to the display duration of the first bit-plane data, then execute step S24.

In the case that the loading duration of the single bit-plane data is less than or equal to the display duration of the first bit-plane data, that is, there is enough time to load the second bit-plane data during the display of the first bit-plane data, the loading of the second bit-plane data can be completed while controlling the liquid crystal display device to display the first bit-plane data, and the liquid crystal display device can be controlled to display the second bit-plane data after the display of the first bit-plane data is completed.

Optionally, in step S23, completing the loading of the second bit-plane data while maintaining the pixel liquid crystal layer corresponding to the first bit-plane data in the target state, specifically including:

loading the second bit-plane data while maintaining the pixel liquid crystal layer corresponding to the first bit-plane data in the target state until the loading of the second bit-plane data is completed.

Wherein, when it is determined that the loading time of the single bit-plane data is longer than the display time of the first bit-plane data, it can be determined that during the process of making the liquid crystal display device display correspondingly based on the first bit-plane data, the time is not enough for the liquid crystal display device to finish loading the second bit-plane data. Therefore, at this time, after the display process corresponding to the first bit-plane data is completed, the liquid crystal display device can be controlled so that the pixel liquid crystal layer corresponding to the first bit-plane data returns to the target state, the liquid crystal display device can obtain enough time to complete the loading of the second bit-plane data, and the liquid crystal display device can smoothly perform corresponding display based on the second bit-plane data.

Specifically, the second bit-plane data may not be loaded until the first bit-plane data is displayed. That is, after the display process of the first bit-plane data, the second bit-plane data is loaded from zero until the loading is completed while maintaining the pixel liquid crystal layer corresponding to the first bit-plane data in the target state.

Based on the above method, it is possible to prevent the display process of the liquid crystal display device from being affected due to data loading occupying relevant resources of the liquid crystal display device, thereby avoiding abnormal display of the liquid crystal display device and improving the reliability of the liquid crystal display device.

In an application scenario, the above-mentioned display driving method is further described by taking a total of 4 bit-plane data that needs to be loaded and displayed as an example. Please refer to FIG. 4, where (A) portion of FIG. 4 shows display durations of four bit-plane data (bit-plane data 3-0), and the display durations corresponding to bit-plane data 3-0 are halved one by one.

Figure 4:
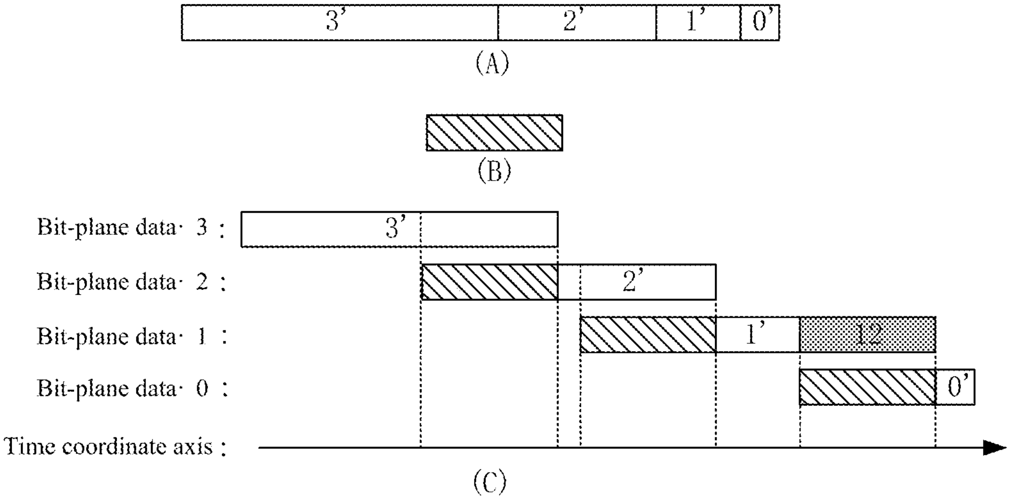
FIG. 4 is a diagram of a relevant duration of an embodiment of bit-plane data of the present disclosure.

(B) portion of FIG. 4 shows the loading duration required for loading any data in the bit-plane data 3-0, which is less than the display duration of bit-plane data 3 and 2 and longer than the display duration of bit-plane data 1 and 0.

(C) portion of FIG. 4 shows adding a process of maintaining the pixel liquid crystal layer corresponding to the first bit-plane data in the target state after the display process of the corresponding bit-plane data by the above-mentioned method of loading the second bit-plane data while maintaining the pixel liquid crystal layer corresponding to the first bit-plane data in the target state until the loading of the second bit-plane data is completed. Wherein the entire process of displaying the bit-plane data 3-0 is divided into multiple process segments. (C) portion of FIG. shows the display process 3' of bit-plane data 3, the display process 2' of bit-plane data 2, the display process 1' of bit-plane data 1, the process 12 oft maintaining the liquid crystal layer of the pixel corresponding to the first bit-plane data in the target state after the display process of bit-plane data 1 and the display process 0' of bit-plane data 0.

As shown in (C) portion of FIG. 4, the duration ratio of each process is as follows:

T3 of display process 3' of bit-plane data 3: T2 of display process 2' of bit-plane data 2: T1 of display process 1' of bit-plane data 1: TO of display process 0' of bit-plane data 0=8:4:2:1.

The total duration of the process 12 of maintaining the liquid crystal layer of the pixel corresponding to the first bit-plane data of the bit-plane data 1 in the target state is longer than or equal to the loading duration of a single bit-plane data.

During the process of displaying based on bit-plane data 3, the loading of bit-plane data 2 can be completed within the display duration of bit-plane data 3, and the display based on bit-plane data 2 can be started after the display of bit-plane data 3 is completed.

During the process of displaying based on bit-plane data 2, the loading of bit-plane data 1 can be completed within the display duration of bit-plane data 2, and the display based on bit-plane data 1 can be started after the display of bit-plane data 2 is completed.

During the process of displaying based on bit-plane data 1, bit-plane data 0 can be loaded within the display duration of bit-plane data 1, and after the display of the bit-plane data 1 is completed while maintaining the pixel liquid crystal layer corresponding to the first bit-plane data in the target state, the loading of the bit-plane data 0 is continued until the loading is completed, and then the display based on bit-plane data 0 can be started.

For example, in a specific case, as shown in (C) portion of FIG. 4, under the time axis, during the display process 3' of the bit-plane data 3, the bit-plane data is loaded for the bit-plane data 2 at the same time, and the same texture-filled rectangle as in (B) portion of FIG. 4 shown before the display process 2' of the bit-plane data 2 represents the loading process of the bit-plane data 2.

During the display process 2' of the bit-plane data 2, the bit-plane data is loaded for the bit-plane data 1 at the same time, and the same texture-filled rectangle as in (B) portion of FIG. 4 shown before the display process 1' of the bit-plane data 1 represents the loading process of bit-plane data 1.

During the process 12 in which the pixel liquid crystal layer corresponding to the first bit-plane data of bit-plane data 1 is maintained in the target state, the bit-plane data is loaded for bit-plane data 0 at the same time, and the same texture-filled rectangle as in (B) portion of FIG. 4 shown before the display process 0' of bit-plane data 0 represents the loading process of bit-plane data 0. After the loading process of bit-plane data 0 is the display process 0' of bit-plane data 0.

Based on the above method, by adding a process of maintaining the pixel liquid crystal layer corresponding to the first bit-plane data in the target state for the bit-plane data whose display duration is shorter than the loading duration of a single bit-plane data, and by maintaining the pixel liquid crystal layer corresponding to the first bit-plane data in the target state for a period longer than or equal to the loading duration of the single bit-plane data, during the process of displaying the bit-plane data and maintaining the pixel liquid crystal layer corresponding to the first bit-plane data in the target state, enough time is obtained to load the next bit-plane data of the bit-plane data.

It should be noted that, in practice, the quantity of the above-mentioned bit-plane data may be any number, which may be determined according to actual requirements, and is not limited here.

Optionally, the liquid crystal display device is an LCoS liquid crystal display device.

Specifically, the liquid crystal display device may be an LCoS liquid crystal display device, or may be replaced with another type of liquid crystal display device if conditions permit, which may be determined according to actual needs, and is not limited here.

On the basis that the liquid crystal display device is an LCoS liquid crystal display device, furthermore, the display duration of the first bit-plane data is twice the display duration of the second bit-plane data next displayed.

Specifically, during the display process of the liquid crystal display device, the above-mentioned first bit-plane data and second bit-plane data displayed adjacently are displayed sequentially, and the duration of the display process corresponding to the first bit-plane data is twice the duration of the display process corresponding to the second bit-plane data.

On the basis that the liquid crystal display device is an LCoS liquid crystal display device, further, one frame of image data includes a plurality of bit-plane data, and the plurality of bit-plane data may include at least two bit-plane data in a first interval, and a display duration of each bit-plane data in the first interval is less than the loading duration of the single bit-plane data.

In any two adjacent bit-plane data of the at least two bit-plane data in the first interval, the display duration of the bit-plane data previously displayed is twice the display duration of the bit-plane data next displayed.

Wherein, the plurality of bit-plane data may further include at least two bit-plane data in a second interval, and the display duration of each bit-plane data in the second interval is longer than or equal to the loading duration of the single bit-plane data;

A display period of the bit-plane data in the second interval is modulated into a plurality of sub-display periods of an equal display duration based on a preset display period of a bit-plane.

Specifically, when displaying a plurality of bit-plane data in the one frame of image data, bit-plane data whose sub-display period in the second interval is close to the display period of the first interval may be preferentially displayed.

Figure 5:
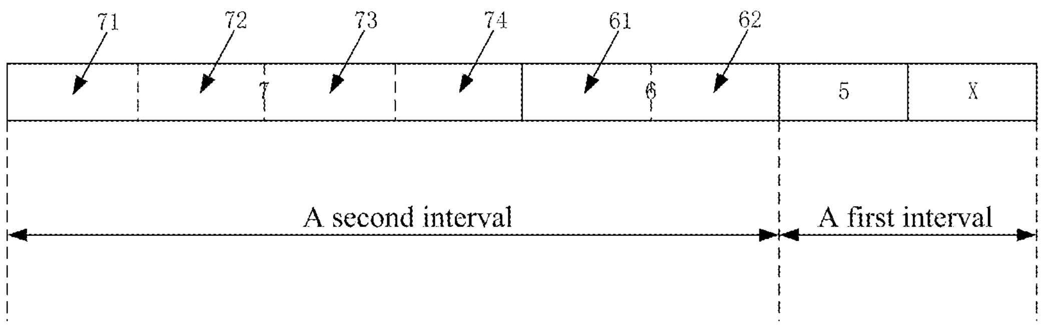
FIG. 5 is a diagram of the relevant duration of another embodiment of bit-plane data of the present disclosure.

In an application scenario, as shown in FIG. 5, a frame of image data may include bit-plane data 7, 6, 5 and X, wherein bit-plane data X includes bit-plane data 4, 3, 2, 1 and 0. Wherein, according to the relationship between each bit-plane data and the loading duration of a single bit-plane data, each bit-plane data in a frame of image can be divided into data of different intervals.

As shown in FIG. 5, assuming that the display duration of the bit-plane data 5 and X is shorter than the loading duration of a single bit-plane data, the bit-plane data 5 and X are divided into bit-plane data in the first interval. It is also assumed that the display duration of the bit-plane data 7 and 6 is longer than or equal to the loading duration of a single bit-plane data, so the bit-plane data 7 and 6 are divided into bit-plane data in the second interval.

As shown in FIG. 5, the display periods corresponding to the bit-plane data 7 and 6 in the second interval are modulated into sub-display periods 71-74 and sub-display periods 61-62, and the display durations of any two sub-display periods in the sub-display periods 71-74 and the sub-display periods 61-62 are the same.

Optionally, the positions of the bit-plane data 7 and 6 are not restricted by the order of positions shown in FIG. 5. That is, the bit-plane data 7 and 6 may be two adjacent bit-plane data, or two spaced-apart bit-plane data, which is not limited here.

When displaying the image corresponding to one frame of image data, some sub-display periods close to the first interval can be preferentially displayed, for example:

In a first manner, the sub-display periods 74, 61, 62 can be displayed first, and then the sub-display periods 71, 72, 73 can be displayed.

In a second manner, the sub-display periods 61, 62 can be displayed first, and then the sub-display periods 71, 72, 73, 74 can be displayed.

In a third manner, the sub-display period 62 can be displayed first, and then the sub-display periods 71, 72, 73, 74, 61 can be displayed.

In addition to the above three methods, other methods may also be used to preferentially display the display period close to the first interval.

Based on the above method, by preferentially displaying all or some of the sub-display periods of the bit-plane data close to the first interval and then displaying all or some of the sub-display periods of the bit-plane data far away from the first interval, the occurrence of pixel crosstalk caused by keeping the pixels in the liquid crystal display device fixed for a long time and keeping the voltage difference between pixels at the maximum because the display duration of the bit-plane data in the second interval is too long can be reduced, and the time for maintaining the maximum voltage difference between pixels is reduced, thereby improving the user experience of the liquid crystal display device.

In addition, after displaying the bit-plane data 7 and 6 in the second interval, the bit-plane data 5-0 in the first interval can be displayed, and the display of the bit-plane data in the first interval can be performed by adding a process of maintaining the pixel liquid crystal layer corresponding to the first bit-plane data in the target state according to the application scenario shown in FIG. 4, so as to ensure that when displaying the bit-plane data in the first interval and correspondingly maintaining the pixel liquid crystal layer corresponding to the first bit-plane data in the target state, there is enough time to complete the loading of the next bit-plane data.

Optionally, a total duration of the pixel liquid crystal layer corresponding to the first bit-plane data being maintained in the target state is longer than or equal to the loading duration of the single bit-plane data.

Specifically, if the total duration of the pixel liquid crystal layer corresponding to the first bit-plane data being maintained in the target state is longer than or equal to the loading duration of the single bit-plane data, even if the loading of the second bit-plane data starts after the pixel liquid crystal layer corresponding to the first bit-plane data returns to the target state, the loading of the second bit-plane data can be completed before the liquid crystal layer of the pixel finishes maintaining the target state, which provides sufficient loading time for the second bit-plane data.

Further, step S23 may specifically include:

While maintaining the pixel liquid crystal layer corresponding to the first bit-plane data in the target state, loading the second bit-plane data until the loading of the second bit-plane data is completed.

Specifically, when the pixel liquid crystal layer corresponding to the first bit-plane data is in the target state, the loading of the second bit-plane data can be started, and the second bit-plane can be completed while maintaining the pixel liquid crystal layer in the target state, avoiding the need to load the second bit-plane data while displaying the first bit-plane data, thereby increasing the calculation processing capacity of the liquid crystal display device and affecting the normal progress of the screen display, and improving the display effect of the liquid crystal display device.

Furthermore, loading the second bit-plane data while maintaining the pixel liquid crystal layer corresponding to the first bit-plane data in the target state until the loading of the second bit-plane data is completed, including:

After the display of the first bit-plane data is completed, determining whether the pixel liquid crystal layer corresponding to the first bit-plane data is in the target state;

When the pixel liquid crystal layer corresponding to the first bit-plane is determined not in the target state, resetting a power supply voltage of the pixel liquid crystal layer corresponding to the first bit-plane data to return the pixel liquid crystal to the target state, and then when the first bit-plane data the corresponding pixel liquid crystal layer is in the target state, loading the second bit-plane data until the loading of the second bit-plane data is completed.

Specifically, after the liquid crystal display device performs display based on the first bit-plane data, if the pixel liquid crystal layer corresponding to the first bit-plane data is not in the target state, then the power supply voltage stored in the pixel liquid crystal layer corresponding to the first bit-plane data can be reset, so that the pixel liquid crystal layer returns to the target state, and then the second bit-plane data is loaded until the loading is completed when the pixel liquid crystal layer corresponding to the first bit-plane data is in the target state.

Wherein, resetting the power supply voltage of the pixel liquid crystal layer corresponding to the first bit-plane data including:

applying a preset voltage to the pixel liquid crystal layer corresponding to the first bit-plane data through a pixel electrode in the liquid crystal display device, so that a negative voltage difference is formed between the pixel electrode and the common electrode in the liquid crystal display device.

It should be noted that, for each pixel in the liquid crystal display device, it is equipped with a corresponding pixel electrode and a corresponding common electrode, and the difference voltage between the voltages provided by the pixel electrode and the common electrode is the power supply voltage of the pixel.

By applying the preset voltage to the pixel liquid crystal layer corresponding to the first bit-plane data, the power supply voltage corresponding to the pixel point becomes a negative voltage, which can force the liquid crystal molecules in the pixel liquid crystal layer to enter the state under the control of no electric field, avoiding the situation that the liquid crystal molecules are still deflected to a certain extent relative to the state under the control of no electric field, preventing the mutual influence of the pixel liquid crystal layers between adjacent pixels, and improving the display effect of the liquid crystal display device.

Different from the prior art, in the technical solution of the present disclosure, when the loading duration of a single bit-plane data is longer than the display duration of the first bit-plane data, the pixel liquid crystal layer corresponding to the first bit-plane data in the liquid crystal display device is controlled to return to the target state after controlling the liquid crystal display device to display the first bit-plane data, and the loading of the second bit-plane data is completed while maintaining the pixel liquid crystal layer corresponding to the first bit-plane data in the target state, so that the liquid crystal display device can obtain enough time to load the second bit-plane data before displaying the second bit-plane data, and the pixel liquid crystal layer corresponding to the first bit-plane data returns to the state of the liquid crystal molecules in the pixel liquid crystal layer under the control of no electric field after displaying the first bit-plane data, the situation that the state of the pixel liquid crystal layer of one pixel has an additional influence on the state of the pixel liquid crystal layer of another pixel between adjacent pixels in the liquid crystal display device is avoided, cost of data driving is reduced and the display effect of the liquid crystal display device is improved.

Figure 6:
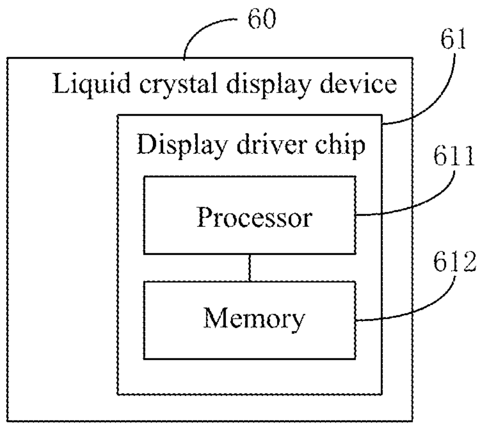
FIG. 6 is a diagram of an embodiment of a liquid crystal display device of the present disclosure.

The present disclosure further proposes a display driver chip, as shown in FIG. 6. FIG. 6 is a diagram of an embodiment of a liquid crystal display device of the present disclosure. The display driver chip can be arranged in the liquid crystal display device 60. When the display driver chip 61 drives the liquid crystal display device 60 to display images, it can execute any one of the display driving methods described in the foregoing embodiments.

The display driver chip 61 may include a processor 611 and a memory 612, and the processor 611 may be used to execute a program corresponding to a liquid crystal driving method stored in the memory 612. The memory 612 can be but not limited to U disk, SD card, PD optical drive, mobile hard disk, large-capacity floppy drive, flash memory, multimedia memory card, server, storage unit in FPGA or ASIC, etc.

Specifically, the display driver chip 61 may be a liquid crystal driver chip. The liquid crystal display device 60 may be an LCoS liquid crystal display device or other types of liquid crystal display devices.

Different from the prior art, in the technical solution of the present disclosure, when the loading duration of a single bit-plane data is longer than the display duration of the first bit-plane data, the pixel liquid crystal layer corresponding to the first bit-plane data in the liquid crystal display device is controlled to return to the target state after controlling the liquid crystal display device to display the first bit-plane data, and the loading of the second bit-plane data is completed while maintaining the pixel liquid crystal layer corresponding to the first bit-plane data in the target state, so that the liquid crystal display device can obtain enough time to load the second bit-plane data before displaying the second bit-plane data, and the pixel liquid crystal layer corresponding to the first bit-plane data returns to the state of the liquid crystal molecules in the pixel liquid crystal layer under the control of no electric field after displaying the first bit-plane data, the situation that the state of the pixel liquid crystal layer of one pixel has an additional influence on the state of the pixel liquid crystal layer of another pixel between adjacent pixels in the liquid crystal display device is avoided, cost of data driving is reduced and the display effect of the liquid crystal display device is improved.

Figure 7:
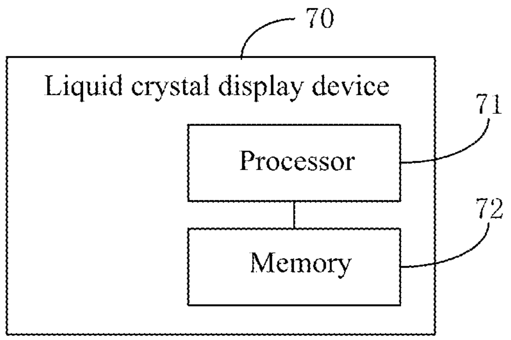
FIG. 7 is a diagram of another embodiment of the liquid crystal display device of the present disclosure.

The present disclosure further proposes a liquid crystal display device, as shown in FIG. 7. FIG. 1 is a diagram of another embodiment of the liquid crystal display device of the present disclosure. The liquid crystal display device 70 can perform any one of the display driving methods described in the foregoing embodiments.

The liquid crystal display device 70 may include a processor 71 and a memory 72. The processor 71 may be configured to execute a program stored in the memory 72 corresponding to a liquid crystal driving method. The memory 72 can be but not limited to U disk, SD card, PD optical drive, mobile hard disk, large-capacity floppy drive, flash memory, multimedia memory card, server, storage unit in FPGA or ASIC, etc.

The above is only the implementation of the present disclosure, and does not limit the patent scope of the present disclosure. Any equivalent structure or equivalent process conversion made by using the specification and drawings of the present disclosure, directly or indirectly used in other related technologies fields, are all included in the scope of patent protection of the present disclosure in the same way.

What is claimed is:

1. A display driving method applied to a liquid crystal display device, the display driving method comprising:

within a display duration of a first bit-plane data, controlling the liquid crystal display device to display the first bit-plane data;

when a loading duration of a single bit-plane data is longer than the display duration of the first bit-plane data, after completing the display of the first bit-plane data , controlling a pixel liquid crystal layer corresponding to the first bit-plane data in the liquid crystal display device to return to a target state, the target state being a state of liquid crystal molecules in the pixel liquid crystal layer under the control of no electric field ; and completing loading of a second bit-plane data while maintaining the pixel liquid crystal layer corresponding to the first bit-plane data in the target state, and controlling the liquid crystal display device to display the second bit-plane data adjacent to the first bit-plane data.

2. The display driving method according to claim 1 further comprising, when the loading duration of the single bit-plane data is less than or equal to the display duration of the first bit-plane data, completing loading of the second bit-plane data during the first bit-plane data is displayed on the liquid crystal display device.

3. The display driving method according to claim 1, wherein a total duration of the pixel liquid crystal layer corresponding to the first bit-plane data being maintained in the target state is longer than or equal to the loading duration of the single bit-plane data.

4. The display driving method according to claim 3, wherein the completing loading of a second bit-plane data while maintaining the pixel liquid crystal layer corresponding to the first bit-plane data in the target state further comprises:

loading the second bit-plane data while maintaining the pixel liquid crystal layer corresponding to the first bit-plane data in the target state until the loading of the second bit-plane data is completed.

5. The display driving method according to claim 4, wherein the loading the second bit-plane data while maintaining the pixel liquid crystal layer corresponding to the first bit-plane data in the target state until the loading of the second bit-plane data is completed further comprises:

after completing the display of the first bit-plane data, determining whether the pixel liquid crystal layer corresponding to the first bit-plane data is in the target state;

when the pixel liquid crystal layer corresponding to the first bit-plane data is determined not in the target state, resetting a power supply voltage of the pixel liquid crystal layer corresponding to the first bit-plane data to return the pixel liquid crystal to the target state; and when the pixel liquid crystal layer corresponding to the first bit-plane data is in the target state, completing loading of the second bit-plane data.

6. The display driving method according to claim 5, wherein the resetting the power supply voltage of the pixel liquid crystal layer corresponding to the first bit-plane data comprises:

applying a preset voltage to the pixel liquid crystal layer corresponding to the first bit-plane data through a pixel electrode in the liquid crystal display device, so that a negative voltage difference is formed between the pixel electrode and a common electrode in the liquid crystal display device.

7. The display driving method according to claim 1, wherein one frame of image data comprises a plurality of bit-plane data, and the plurality of bit-plane data comprises at least two bit-plane data in a first interval, and a display duration of each of the at least two bit-plane data in the first interval is less than the loading duration of the single bit-plane data; in any two adjacent bit-plane data of the at least two bit-plane data in the first interval, the display duration of the bit-plane data previously displayed is twice the display duration of the bit-plane data next displayed.

8. The display driving method according to claim 7, wherein the plurality of bit-plane data further comprises at least two bit-plane data in a second interval, and a display duration of each of the at least two bit-plane data in the second interval is longer than or equal to the loading duration of the single bit-plane data;

a display period of the at least two bit-plane data in the second interval is modulated into a plurality of sub-display periods of an equal display duration based on a preset display period of a bit-plane.

9. A display driver chip, comprising:

a processor; and a non-transitory computer-readable storage medium coupled to the processor and storing programming instructions for execution by the processor, the programming instructions instruct the processor to:

split a received RGB image data into monochrome image data corresponding to red, green, and blue respectively;

convert the monochrome image data into several bit-plane data;

store the bit-plane data;

send the bit-plane data to;

receive the bit-plane data;

display the bit-plane data; and sequentially load the bit-plane data to display corresponding bit-plane data based on the received bit-plane data;

wherein the bit-plane data comprises a first bit-plane data and a second bit-plane data;

the programming instructions further instruct the processor to:

within a display duration of the first bit-plane data, control the display module to display the first bit-plane data;

when a loading duration of a single bit-plane data is longer than the display duration of the first bit-plane data, after completing the display of the first bit-plane data, control a pixel liquid crystal layer corresponding to the first bit-plane data to return to a target state, the target state is a state of liquid crystal molecules in the pixel liquid crystal layer under the control of no electric field; and complete loading of the second bit-plane data while maintaining the pixel liquid crystal layer corresponding to the first bit-plane data in the target state, and control to display the second bit-plane data adjacent to the first bit-plane data.

10. A liquid crystal display device, comprising:

a processor; and a non-transitory computer-readable storage medium coupled to the processor and storing programming instructions for execution by the processor, the programming instructions instruct the processor to:

within a display duration of a first bit-plane data, control the liquid crystal display device to display the first bit-plane data;

when a loading duration of a single bit-plane data is longer than the display duration of the first bit-plane data, after completing the display of the first bit-plane data, control a pixel liquid crystal layer corresponding to the first bit-plane data in the liquid crystal display device to return to a target state, the target state being a state of liquid crystal molecules in the pixel liquid crystal layer under the control of no electric field; and complete loading of a second bit-plane data while maintaining the pixel liquid crystal layer corresponding to the first bit-plane data in the target state, and control the liquid crystal display device to display the second bit-plane data adjacent to the first bit-plane data.

11. The liquid crystal display device according to claim 10, wherein the programming instructions instruct the processor to:

when the loading duration of the single bit-plane data is less than or equal to the display duration of the first bit-plane data, complete loading of the second bit-plane data during the first bit-plane data is displayed on the liquid crystal display device.

12. The liquid crystal display device according to claim 10, wherein a total duration of the pixel liquid crystal layer corresponding to the first bit-plane data being maintained in the target state is longer than or equal to the loading duration of the single bit-plane data.

13. The liquid crystal display device according to claim 12, wherein the programming instructions instruct the processor to complete loading of a second bit-plane data while maintaining the pixel liquid crystal layer corresponding to the first bit-plane data in the target state further comprises:

the programming instructions instruct the processor to load the second bit-plane data while maintaining the pixel liquid crystal layer corresponding to the first bit-plane data in the target state until the loading of the second bit-plane data is completed.

14. The liquid crystal display device according to claim 13, wherein the programming instructions instruct the processor to load the second bit-plane data while maintaining the pixel liquid crystal layer corresponding to the first bit-plane data in the target state until the loading of the second bit-plane data is completed further comprises the programming instructions instruct the processor to:

after completing the display of the first b it-plane data, determine whether the pixel liquid crystal layer corresponding to the first bit-plane data is in the target state;

when the pixel liquid crystal layer corresponding to the first bit-plane is determined not in the target state, reset a power supply voltage of the pixel liquid crystal layer corresponding to the first bit-plane data to return the pixel liquid crystal to the target state; and when the pixel liquid crystal layer corresponding to the first bit-plane data is in the target state, complete loading of the second bit-plane data.

15. The liquid crystal display device according to claim 14, wherein the programming instructions instruct the processor to reset the power supply voltage of the pixel liquid crystal layer corresponding to the first bit-plane data comprises the programming instructions instruct the processor to apply a preset voltage to the pixel liquid crystal layer corresponding to the first bit-plane data through a pixel electrode in the liquid crystal display device, so that a negative voltage difference is formed between the pixel electrode and a common electrode in the liquid crystal display device.

16. The liquid crystal display device according to claim 10, wherein one frame of image data comprises a plurality of bit-plane data, and the plurality of bit-plane data comprises at least two bit-plane data in a first interval, and a display duration of each of the at least two bit-plane data in the first interval is less than the loading duration of the single bit-plane data; in any two adjacent bit-plane data of the at least two bit-plane data in the first interval, the display duration of the bit-plane data previously displayed is twice the display duration of the bit-plane data next displayed.

17. The liquid crystal display device according to claim 16, wherein the plurality of bit-plane data further comprises at least two bit-plane data in a second interval, and a display duration of each of the at least two bit-plane data in the second interval is longer than or equal to the loading duration of the single bit-plane data;

a display period of the at least two bit-plane data in the second interval is modulated into a plurality of sub-display periods of an equal display duration based on a preset display period of a bit-plane.

* * * * *